(12) United States Patent
Muta

(10) Patent No.: US 8,040,084 B2
(45) Date of Patent: Oct. 18, 2011

(54) VEHICLE, CONTROL METHOD THEREOF AND BRAKING DEVICE

(75) Inventor: Koichiro Muta, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 476 days.

(21) Appl. No.: 12/162,554

(22) PCT Filed: Jan. 10, 2007

(86) PCT No.: PCT/JP2007/050543
§ 371 (c)(1),
(2), (4) Date: Jul. 29, 2008

(87) PCT Pub. No.: WO2007/088725
PCT Pub. Date: Aug. 9, 2007

(65) Prior Publication Data
US 2009/0051304 A1    Feb. 26, 2009

(30) Foreign Application Priority Data
Jan. 31, 2006    (JP) .................................. 2006-022457

(51) Int. Cl.
*H02P 3/14* (2006.01)
(52) U.S. Cl. ........................................ 318/376; 318/375
(58) Field of Classification Search .................. 318/362, 318/376, 430, 432, 434, 757, 375, 759
See application file for complete search history.

(56) References Cited

U.S. PATENT DOCUMENTS

| 5,788,597 | A | | 8/1998 | Boll et al. |
| 5,839,800 | A | * | 11/1998 | Koga et al. ..................... 303/152 |
| 5,895,100 | A | * | 4/1999 | Ito et al. ......................... 303/152 |
| 6,508,523 | B2 | * | 1/2003 | Yoshino ......................... 303/152 |
| 6,528,959 | B2 | * | 3/2003 | Kitano et al. .................... 318/55 |
| 6,735,511 | B2 | * | 5/2004 | Nakamura et al. .............. 701/70 |
| 6,784,563 | B2 | * | 8/2004 | Nada ........................... 290/40 C |
| 6,915,198 | B2 | * | 7/2005 | Phillips et al. .................. 701/54 |

(Continued)

FOREIGN PATENT DOCUMENTS

| DE | 10 2004 044 599 A1 | 4/2005 |
| EP | 0 758 591 A1 | 2/1997 |
| JP | 08-140203 A | 5/1996 |
| JP | 09-074605 A | 3/1997 |
| JP | 2002-345105 A | 11/2002 |
| JP | 2004-135471 A | 4/2004 |

OTHER PUBLICATIONS

*Hybrid Vehicle Dynamcis*, Automotive Engineering, Society of Automotive Engineers, Warrendale, US, vol. 110, No. 7, Jul. 2002, pp. 54-56, 58, 60.

*Primary Examiner* — Bentsu Ro
*Assistant Examiner* — Antony M Paul
(74) *Attorney, Agent, or Firm* — Kenyon & Kenyon LLP

(57) ABSTRACT

During braking, lower limits are set based on an input limit of a battery and a brake pedal position, and the set lower limits limit regenerative torques output from motors. This prevents an output of an excessive braking force and torque shock caused by a hydraulic brake being not able to follow sudden changes in the regenerative torques output from the motors when the vehicle speed is reduced.

14 Claims, 8 Drawing Sheets

U.S. PATENT DOCUMENTS

| | | | |
|---|---|---|---|
| 6,930,405 B2 * | 8/2005 | Gunji | 290/40 C |
| 7,034,482 B2 * | 4/2006 | Komiyama et al. | 318/376 |
| 7,167,783 B2 * | 1/2007 | Park et al. | 701/22 |
| 7,826,941 B2 * | 11/2010 | Hayashi et al. | 701/22 |
| 2002/0116101 A1 | 8/2002 | Hashiba et al. | |
| 2004/0070270 A1 * | 4/2004 | Gunji | 303/152 |
| 2004/0122579 A1 | 6/2004 | Ashizawa et al. | |
| 2004/0204285 A1 | 10/2004 | Ueno | |

* cited by examiner

VEHICLE, CONTROL METHOD THEREOF AND BRAKING DEVICE

This is a 371 national phase application of PCT/JP2007/050543 filed 10 Jan. 2007, claiming priority to Japanese Patent Application No. JP 2006-022457 filed 31 Jan. 2006, the contents of which are incorporated herein by reference.

TECHNICAL FIELD

The present invention relates to a vehicle, a control method thereof and a braking device.

BACKGROUND ART

One proposed vehicle includes a front wheel motor MGf that can drive front wheels, a rear wheel motor MGr that can drive rear wheels, and a battery that can transfer electric power to and from the two motors MGf and MGr, and drives the two motors MGf and MGr within a range of a charging limit value of the battery when a braking force is requested (see, for example, Patent Document 1). In this vehicle, during braking, a torque command for regeneration of the rear wheel motor MGr that is low in driving frequency is first set within the range of the charging limit value of the battery, then a torque command for regeneration of the front wheel motor MGf is set under the limit using the set torque command of the rear wheel motor MGr and the charging limit value of the battery to perform regenerative control of the front wheel motor MGf and the rear wheel motor MGr. This prevents heat generation of the front wheel motor MGf that is high in driving frequency.

Patent Document 1: Japanese Patent Laid-Open Gazette No. 2002-345105

DISCLOSURE OF THE INVENTION

A motor vehicle such as the above described vehicle generally includes a hydraulically driven machine brake for applying a braking force besides a driving motor, and when a braking force that can be applied by regenerative control of the motor is insufficient, the machine brake is operated to obtain a desired braking force. In order to prevent occurrence of torque shock at the stop of the vehicle, the braking force by the machine brake is substituted for the braking force by the motor before the stop. At this time, if the torque command of the motor is set by the charging limit value only of the battery as in the above described vehicle, the motor is controlled to output a large regenerative torque because of a low rotation speed of the motor at a low vehicle speed, and hydraulic driving takes a certain time, thereby preventing smooth coordination between the braking force by the motor and the braking force by the machine brake, which may cause torque shock. This phenomenon prominently occurs when the charging limit of the battery is strict.

A vehicle, a control method thereof and a braking device according to the present invention has an object to prevent occurrence of torque shock during braking. The vehicle, the control method thereof and the braking device according to the present invention has another object to allow smooth coordination between a braking force by a motor and a braking force by a machine brake. Further, the vehicle, the control method thereof and the braking device according to the present invention has a further object to increase energy efficiency by regeneration of a larger amount of kinetic energy to electric power during braking.

In order to achieve at least part of the above described objects, the vehicle, the control method thereof and the braking device according to the present invention takes the following measures.

The present invention is directed to a vehicle including: a braking force application unit that applies a braking force by hydraulic actuation; at least one motor that can output a regenerative torque; an electric storage unit that can transfer electric power to and from the motor; a rotation speed detection unit that detects a rotation speed of the motor; an input limit setting unit that sets an input limit as maximum permissible electric power in charging the electric storage unit based on a state of the electric storage unit; a braking request detection unit that detects a braking request requested by the vehicle; a lower limit regenerative torque setting unit that sets a lower limit regenerative torque as a lower limit value of a regenerative torque output from the motor based on the detected braking request and the set input limit; and a braking control unit that controls the motor and the braking force application unit so that the regenerative torque is output from the motor within a range of a rated torque of the motor based on the detected rotation speed of the motor, the set input limit, and the set lower limit regenerative torque, and a braking force according to the detected braking request is applied to the vehicle.

In the vehicle of the present invention, a lower limit regenerative torque as a lower limit value of a regenerative torque output from a motor is set based on a braking request requested by the vehicle and an input limit set based on a state of an electric storage unit, as maximum permissible electric power in charging the electric storage unit, and the motor and a braking force application unit are controlled so that the regenerative torque is output from the motor within a range of a rated torque of the motor based on a rotation speed of the motor, the input limit of the electric storage unit, and the lower limit regenerative torque, and a braking force according to the braking request is applied to the vehicle. This allows the regenerative torque from the motor to be limited to the lower limit regenerative torque set based on the input limit of the electric storage unit and the braking request, and prevents a small (large as an absolute value) regenerative torque exceeding the lower limit regenerative torque from being output from the motor even if the rotation speed of the motor is reduced. This allows smooth coordination between the braking force by the motor and the braking force by the braking force application unit even if the rotation speed of the motor is reduced, and prevents occurrence of torque shock caused by rough coordination between the braking force by the motor and the braking force by the braking force application unit. Originally, kinetic energy of the vehicle is regenerated to electric power by an output of the regenerative torque by the motor, thereby increasing energy efficiency of the vehicle. As the braking request, an operation amount of a brake pedal by an operator, or physical quantities relating thereto, for example, a depression force, brake pressure, or deceleration of the vehicle by application of the brake. For the lower limit regenerative torque, the regenerative torque is a negative value.

In the vehicle of the present invention, the lower limit regenerative torque setting unit may set the lower limit regenerative torque so that an absolute value thereof becomes smaller as an absolute value of the set input limit becomes smaller, and the lower limit regenerative torque setting unit may set the lower limit regenerative torque so that the absolute value thereof becomes smaller as an absolute value of the detected braking request becomes larger. This arrangement ensures to set the regenerative torque of the motor according to the input limit of the electric storage unit and the braking request.

In the vehicle of the present invention, the braking control unit may control the motor so that the largest (smallest as an absolute value) regenerative torque within the range of the rated torque of the motor, the set input limit and the set lower limit regenerative torque is output from the motor, and may control the braking force application unit so that a braking force of a difference between a driving force according to the detected braking request and a braking force by the regenerative torque output from the motor is applied from the braking force application unit. This arrangement regenerates a larger amount of kinetic energy of the vehicle to electric power.

In the vehicle of the present invention, the braking control unit may control the motor and the braking force application unit so that when the rotation speed detected by the rotation speed detection unit is a predetermined rotation speed or higher, the regenerative torque is output from the motor within the range of the rated torque of the motor, an input limit torque based on the set input limit, and the set lower limit regenerative torque, and the braking force according to the detected braking request is applied to the vehicle, and may control the motor and the braking force application unit so that when the rotation speed detected by the rotation speed detection unit is lower than the predetermined rotation speed, no regenerative torque is output from the motor, and the braking force according to the detected braking request is applied to the vehicle. This arrangement prevents the torque shock that may occur at the stop of the motor.

In the vehicle of the present invention, the motor may be a plurality of motors connected to different axles, and the lower limit regenerative torque setting unit may set a lower limit regenerative torque for each of the plurality of motors, the braking control unit performs control so that a regenerative torque is output from each of the plurality of motors within a range of a rated torque of each of the plurality of motors, the set input limit, and a lower limit regenerative torque set for each of the plurality of motors. This arrangement limits the regenerative torque from each motor to the lower limit regenerative torque set based on the input limit of the electric storage unit and the braking request and the rated torque of each motor, thereby prevents a large regenerative torque from being output from each motor even when a rotation speed of each motor is reduced. This allows smooth coordination between the braking force by each motor and the braking force by the braking force application unit, and prevents occurrence of torque shock caused by rough coordination between the braking force by any of the motors and the braking force by the braking force application unit.

The braking device of the present invention is directed to a braking device that applies a braking force to a mobile unit including: a braking force application unit that applies a braking force by hydraulic actuation; at least one motor that can output a regenerative torque; an electric storage unit that can transfer electric power to and from the motor; a rotation speed detection unit that detects a rotation speed of the motor; an input limit setting unit that sets an input limit as maximum permissible electric power in charging the electric storage unit based on a state of the electric storage unit; a braking request detection unit that detects a braking request requested by the mobile unit; a lower limit regenerative torque setting unit that sets a lower limit regenerative torque as a lower limit value of a regenerative torque output from the motor based on the detected braking request and the set input limit; and a braking control unit that controls the motor and the braking force application unit so that the regenerative torque is output from the motor within a range of a rated torque of the motor based on the detected rotation speed of the motor, the set input limit, and the set lower limit regenerative torque, and a braking force according to the detected braking request is applied to the mobile unit.

In the braking device of the present invention, a lower limit regenerative torque as a lower limit value of a regenerative torque output from a motor is set based on a braking request requested by the mobile unit and an input limit set based on a state of an electric storage unit, as maximum permissible electric power in charging the electric storage unit, and the motor and a braking force application unit are controlled so that the regenerative torque is output from the motor within a range of a rated torque of the motor based on a rotation speed of the motor, the input limit of the electric storage unit, and the lower limit regenerative torque, and a braking force according to the braking request is applied to the mobile unit. This allows the regenerative torque from the motor to be limited to the lower limit regenerative torque set based on the input limit of the electric storage unit and the braking request, and prevents a small (large as an absolute value) regenerative torque exceeding the lower limit regenerative torque from being output from the motor even if the rotation speed of the motor is reduced. This allows smooth coordination between the braking force by the motor and the braking force by the braking force application unit even if the rotation speed of the motor is reduced, and prevents occurrence of torque shock caused by rough coordination between the braking force by the motor and the braking force by the braking force application unit. Originally, kinetic energy of the vehicle is regenerated to electric power by an output of the regenerative torque by the motor, thereby increasing energy efficiency of the mobile unit. For the lower-limit regenerative torque, the regenerative torque is a negative value.

A control method of a vehicle of the invention is directed to the vehicle including: a braking force application unit that applies a braking force by hydraulic actuation; at least one motor that can output a regenerative torque; and an electric storage unit that can transfer electric power to and from the motor. The control method includes the steps of: setting a lower limit regenerative torque as a lower limit value of the regenerative torque output from the motor based on a braking request requested by the vehicle, and an input limit as maximum permissible electric power in charging the electric storage unit; and controlling the motor and the braking force application unit so that the regenerative torque is output from the motor within a range of a rated torque of the motor based on a rotation speed of the motor, the input limit, and the set lower limit regenerative torque, and a braking force according to the braking request is applied to the vehicle.

In the control method of the vehicle, a lower limit regenerative torque as a lower limit value of a regenerative torque output from a motor is set based on a braking request requested by the vehicle and an input limit set based on a state of an electric storage unit, as maximum permissible electric power in charging the electric storage unit, and the motor and a braking force application unit are controlled so that the regenerative torque is output from the motor within a range of a rated torque of the motor based on a rotation speed of the motor, the input limit and the lower limit regenerative torque, and a braking force according to the braking request is applied to the vehicle. This allows the regenerative torque from the motor to be limited to the lower limit regenerative torque set based on the input limit of the electric storage unit and the braking request, and prevents a small (large as an absolute value) regenerative torque exceeding the lower limit regenerative torque from being output from the motor even if the rotation speed of the motor is reduced. This allows smooth coordination between the braking force by the motor and the braking force by the braking force application unit even if the rotation speed of the motor is reduced, and prevents occurrence of torque shock caused by rough coordination between the braking force by the motor and the braking force by the braking force application unit. Originally, kinetic energy of the vehicle is regenerated to electric power by an output of the regenerative torque by the motor, thereby increasing energy efficiency of the vehicle. As the braking request, an operation amount of a brake pedal by an operator, or physical quantities relating thereto, for example, a depression force, brake pressure, or deceleration of the vehicle by application of the brake. For the lower limit regenerative torque, the regenerative torque is a negative value.

In one preferable embodiment of the control method of the vehicle, the control method includes the step of setting the lower limit regenerative torque so that an absolute value thereof becomes smaller as an absolute value of the input limit becomes smaller, and the lower limit regenerative torque so that the absolute value thereof becomes smaller as an absolute value of the braking request becomes larger. This arrangement ensures to set the regenerative torque of the motor according to the input limit of the electric storage unit and the braking request.

In another preferable embodiment of the control method of the vehicle, the control method includes the step of controlling the motor so that the largest (smallest as an absolute value) regenerative torque within the range of the rated torque of the motor and the set lower limit regenerative torque is output from the motor, and controlling the braking force application unit so that a braking force of a difference between a driving force according to the braking request and a braking force by the regenerative torque output from the motor is applied from the braking force application unit. This arrangement regenerates a larger amount of kinetic energy of the vehicle to electric power.

In another preferable embodiment of the control method of the vehicle, the control method includes the step of controlling the motor and the braking force application unit so that when the rotation speed of the motor is a predetermined rotation speed or higher, the regenerative torque is output from the motor within the range of the rated torque of the motor, an input limit torque based on the input limit, and the set lower limit regenerative torque, and the braking force according to the braking request is applied to the vehicle, and controlling the motor and the braking force application unit so that when the rotation speed of the motor is lower than the predetermined rotation speed, no regenerative torque is output from the motor, and the braking force according to the braking request is applied to the vehicle. This arrangement prevents the torque shock that may occur at the stop of the motor.

BEST MODE FOR CARRYING OUT THE INVENTION

Figure 1:
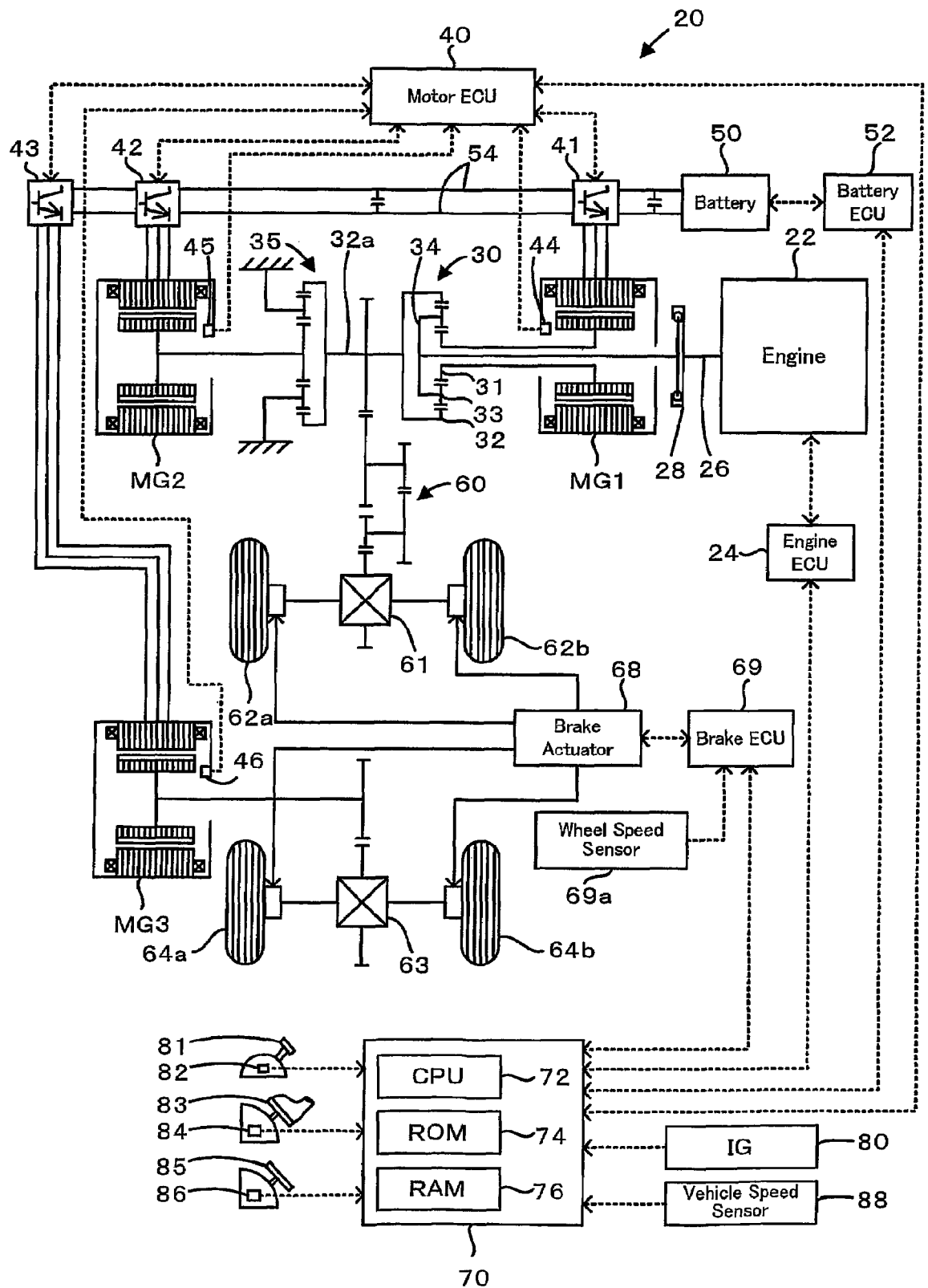
FIG. 1 schematically shows a configuration of a hybrid automobile 20 according to an embodiment of the present invention.

Next, the best mode for carrying out the invention will be described with reference to an embodiment. FIG. 1 schematically shows a configuration of a hybrid automobile 20 according to an embodiment of the present invention. As shown, the hybrid automobile 20 of the embodiment includes an engine 22, a three-shaft power distribution and integration mechanism 30 connected via a damper 28 to a crankshaft 26 as an output shaft of the engine 22, a motor MG1 that is connected to the power distribution and integration mechanism 30 and can generate electric power, a speed reduction gear 35 connected to the power distribution and integration mechanism 30 and connected to front wheels 62a and 62b via a gear mechanism 60 and a differential gear 61, a motor MG2 connected to the speed reduction gear 35, a motor MG3 connected to rear wheels 64a and 64b via a differential gear 63, and a hybrid electronic control unit 70 that controls the entire driving system of the vehicle.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a as a drive shaft. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 62a and 62b via the gear mechanism 60, and the differential gear 61 from ring gear shaft 32a.

All of the motors MG1, MG2 and MG3 are known synchronous motor generators that are driven as a generator and as a motor. The motors MG1, MG2 and MG3 transmit electric power to and from a battery 50 via inverters 41, 42 and 43. Power lines 54 that connect the inverters 41, 42 and 43 with the battery 50 are constructed as a positive electrode bus line and a negative electrode bus line shared by the inverters 41, 42 and 43. This arrangement enables the electric power generated by one of the motors MG1, MG2 and MG3 to be consumed by the other motors. The battery 50 is charged with a surplus of the electric power generated by any one of the motors MG1, MG2 or MG3 and is discharged to supplement an insufficiency of the electric power. When the power balance is attained among the motors MG1, MG2 and MG3, the battery 50 is neither charged nor discharged. Operations of all the motors MG1, MG2 and MG3 are controlled by a motor electronic control unit (hereafter referred to as motor ECU) 40. The motor ECU 40 receives diverse signals required for controlling the operations of the motors MG1, MG2 and MG3, for example, signals from rotational position detection sensors 44, 45 and 46 that detect the rotational positions of rotors in the motors MG1, MG2 and MG3 and phase currents applied to the motors MG1, MG2 and MG3 and measured by current sensors (not shown). The motor ECU 40 outputs switching control signals to the inverters 41, 42 and 43. The motor ECU 40 communicates with the hybrid electronic control unit 70 to control operations of the motors MG1, MG2 and MG3 in response to control signals transmitted from the hybrid electronic control unit 70 while outputting data relating to the operating conditions of the motors MG1, MG2 and MG3 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

To each of the front wheels 62a and 62b and the rear wheels 64a and 64b, a hydraulic brake actuated by hydraulic pressure from a brake actuator 68 is mounted. The hydraulic pressure from the brake actuator 68 is adjusted by drive control with a brake ECU 69. Wheel speeds Vfl and Vfr of the front wheels 62a and 62b and wheel speeds Vrl and Vrr of the rear wheels 64a and 64b detected by a wheel speed sensor 69a are input to the brake ECU 69 via an unshown input port, and a drive signal to the brake actuator 68 or the like is output from the brake ECU 69 via an output port. The brake ECU 69 communicates with the hybrid electronic control unit 70, drives and controls the brake actuator 68 according to a control signal from the hybrid electronic control unit 70, and outputs data on states of the brake actuator 68, the front wheels 62a and 62b and the rear wheels 64a and 64b to the hybrid electronic control unit 70 as required.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port; an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, the battery ECU 52 and the brake ECU 69 via the communication port to transmit diverse control signals and data to and from the engine ECU 24, the motor ECU 40, the battery ECU 52 and the brake ECU 69, as mentioned previously.

The hybrid automobile 20 of the embodiment thus constructed calculates a requested torque to be output to the vehicle, based on observed values of a vehicle speed V and an accelerator opening Acc, which corresponds to a driver's step-on amount of an accelerator pedal 83. The engine 22 and the motors MG1, MG2 and MG3 are subjected to operation control to drive with a required level of power corresponding to the calculated requested torque. The operation control of the engine 22 and the motors MG1, MG2 and MG3 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1, MG2 and MG3 to cause all the power output from the engine 22 to be subjected to torque conversion and to be output by means of the power distribution integration mechanism 30 and the motors MG1, MG2 and MG3. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1, MG2 and MG3 to cause all or part of the power output from the engine 22 equivalent to the required level of power to be subjected to torque conversion by means of the power distribution integration mechanism 30 and the motors MG1, MG2 and MG3 and output simultaneously with charge or discharge of the battery 50. The motor drive mode stops the operations of the engine 22 and drives and controls the motor MG2 and or MG3 to output a quantity of power equivalent to the required level of power.

Figure 2:
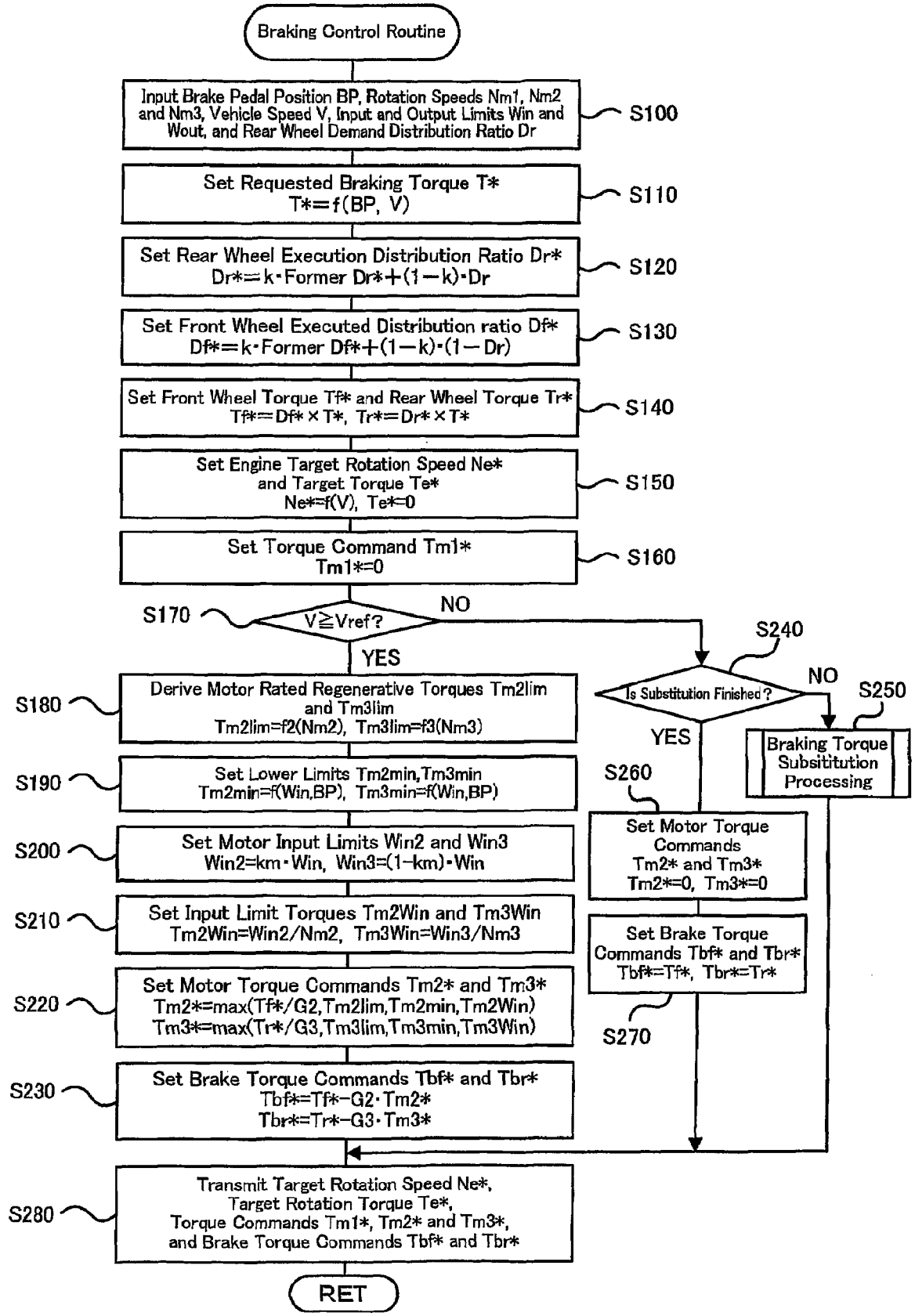
FIG. 2 is a flowchart showing an example of a braking control routine executed by a hybrid electronic control unit 70.

Next, an operation of the hybrid automobile 20 of the embodiment thus configured, particularly, an operation during braking when a brake pedal 85 is depressed by a driver will be described. FIG. 2 is a flowchart showing an example of a braking control routine executed by the hybrid electronic control unit 70. This routine is repeatedly executed at predetermined time intervals (for example, at intervals of 8 msec).

Figure 3:
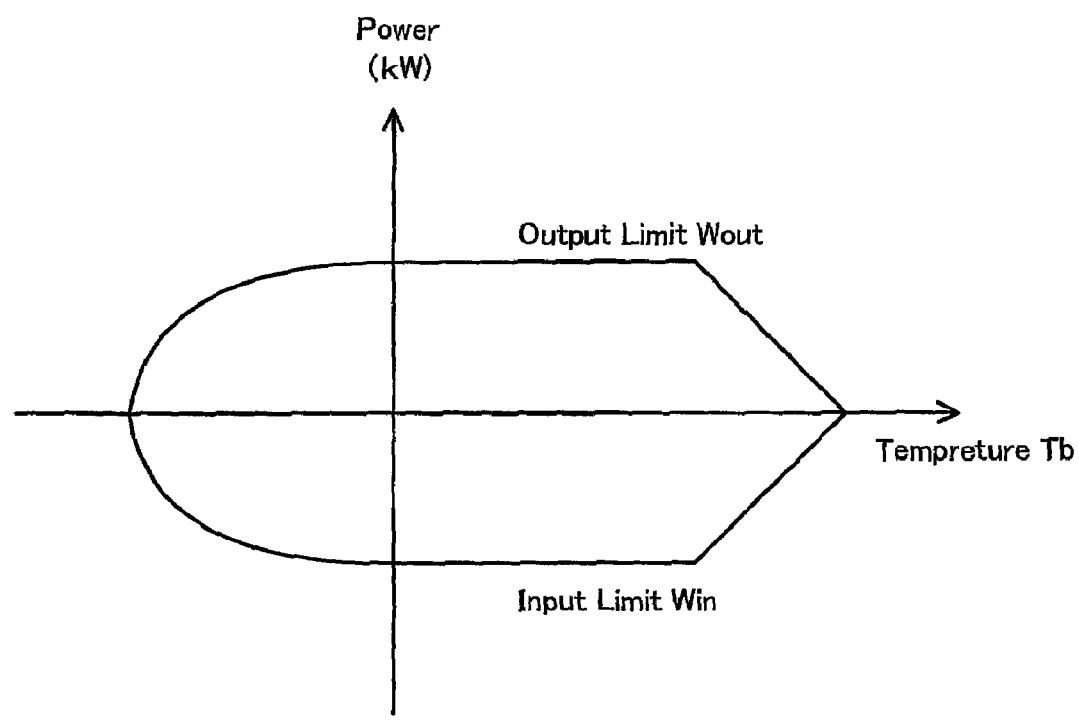
FIG. 3 illustrates an example of a relationship between a battery temperature Tb of a battery 50 and input and output limits Win and Wout.
Figure 4:
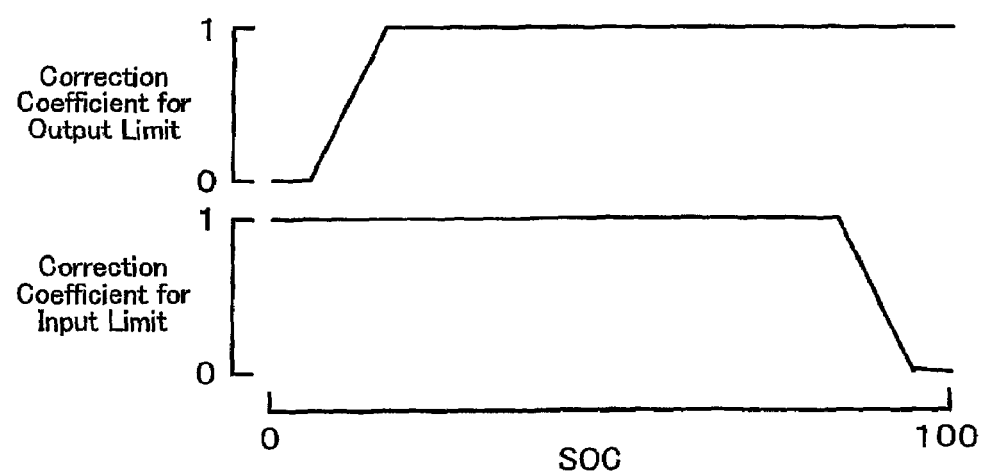
FIG. 4 illustrates an example of a relationship between the State of Charge (SOC) of the battery 50 and correction coefficients of the input and output limits Win and Wout.

When the braking control routine is executed, a CPU 72 of the hybrid electronic control unit 70 first inputs data such as a brake pedal position BP from a brake pedal position sensor 86, a vehicle speed V from a vehicle speed sensor 88, rotation speeds Nm1, Nm2 and Nm3 of the motors MG1, MG2 and MG3, input and output limits Win and Wout of the battery 50, a rear wheel requested distribution ratio Dr, or the like (Step S100). The rotation speeds Nm1, Nm2 and Nm3 of the motors MG1, MG2 and MG3 are each calculated based on rotation positions detected by rotation position detection sensors 44, 45 and 46 and input from a motor ECU 40 by communication. The input and output limits Win and Wout of the battery 50 are set based on a battery temperature Tb of the battery 50 detected by an unshown temperature sensor mounted to the battery 50 and the State of Charge (SOC) of the battery 50 and input from a battery ECU 52 by communication. The input and output limits Win and Wout of the battery 50 can be set by setting basic values of the input and output limits Win and Wout based on the battery temperature Tb, setting an output limit correction coefficient and an input limit correction coefficient based on the State of Charge (SOC) of the battery 50, and multiplying the set basic values of the input and output limits Win and Wout by the correction coefficients. FIG. 3 shows an example of a relationship between the battery temperature Tb and the input and output limits Win and Wout, and FIG. 4 shows an example of a relationship between the State of Charge (SOC) of the battery 50 and the correction coefficients of the input and output limits Win and Wout. The rear wheel requested distribution ratio Dr is set by unshown rear wheel requested distribution ratio setting processing as a request for the ratio of the torque output to the rear wheels 64a and 64b to the sum of the torque output to the front wheels 62a and 62b and the torque output to the rear wheels 64a and 64b, and input from the brake ECU 69 by communication. In the rear wheel requested distribution ratio setting processing in the embodiment, it is determined whether a slip occurs, whether the automobile is starting or abruptly accelerating, and whether the automobile is decelerating, based on a vehicle speed V, a requested braking torque T* (a requested driving torque during driving) set in Step S110 in FIG. 2 described later, the wheel speeds Vfl, Vfr, Vrl and Vrr from the wheel speed sensor 69a, or the like, and the rear wheel requested distribution ratio Dr is set to the value of zero when it is determined that none of the above is met, to a value for slip when it is determined that the slip occurs, to a value for start or abrupt acceleration when it is determined that the automobile is starting or abruptly accelerating, and to a value for deceleration when it is determined that the automobile is decelerating. The rear wheel requested distribution ratio Dr for deceleration may be, for example, 0.5 or 0.4 so that a larger amount of electric energy can be taken out during deceleration by regenerative control with the motor MG2 and the motor MG3.

Figure 5:
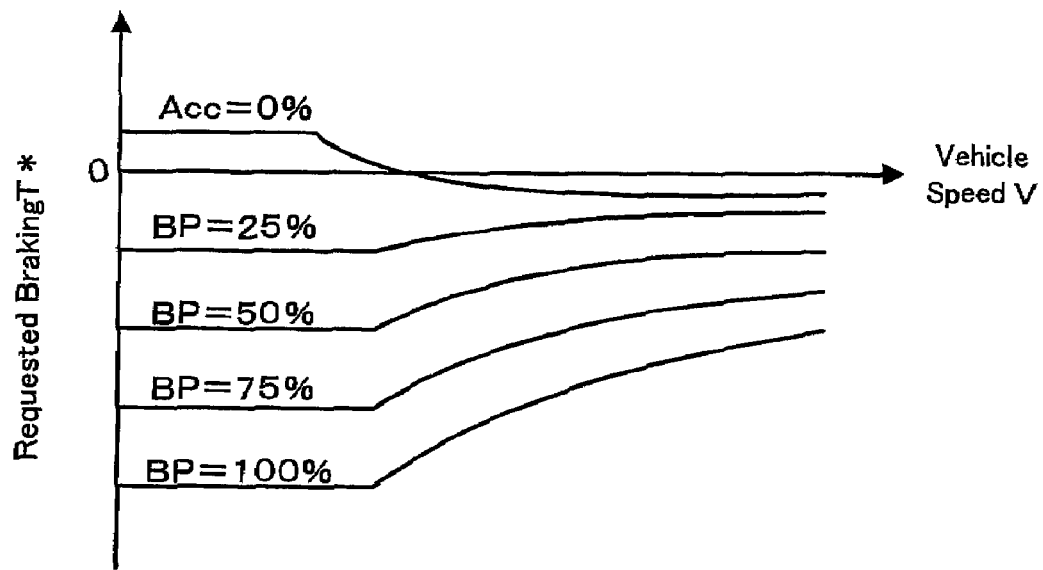
FIG. 5 illustrates an example of a requested braking torque setting map.

Then, processing is performed for setting the requested braking torque T* requested for the entire vehicle based on the input brake pedal position BP and the vehicle speed V (Step. S110). In the embodiment, the requested braking torque T* is set by previously calculating a relationship between the brake pedal position BP, the vehicle speed V and the requested torque T* and storing the relationship in a ROM 74 as a requested braking torque setting map, and deriving a corresponding requested braking torque T* from the map in receipt of the brake pedal position BP and the vehicle speed V. An example of the requested braking torque setting map is shown in FIG. 5.

Then, the rear wheel requested distribution ratio Dr input in Step S100 subjected to smoothing operation by the following formula (1) is set to a rear wheel executed distribution ratio Dr* (Step S120), and a front wheel requested distribution ratio (=1−Dr) obtained by subtracting the rear wheel requested distribution ratio Dr from the value of one, subjected to smoothing operation by the following formula (2) that determines the same time constant as the formula (1) is set to a front wheel executed distribution ratio Df* (Step S130). Thus, the change in the rear wheel requested distribution ratio Dr is subjected to smoothing operation to set the rear wheel executed distribution ratio Dr* (the front wheel executed distribution ratio Df*), thereby preventing quick change of the rear wheel requested distribution ratio Dr from causing quick change of the rear wheel executed distribution ratio Dr* (the front wheel executed distribution ratio Df*) If a torque output response to the front wheels 62a and 62b completely agrees with a torque output response to the rear wheels 64a and 64b, the requested torque T* can be output to the vehicle even in the case of quick change in the rear wheel executed distribution ratio Dr* (the front wheel executed distribution ratio Df*). Considering each output response of the engine 22 and the motors MG1, MG2 and MG3, however, there is actually a shift between the torque output response to the front wheels 62a and 62b and the torque output response to the rear wheels 64a and 64b, and the quick change in the rear wheel executed distribution ratio Dr* (the front wheel executed distribution ratio Df*) may cause shock in the vehicle. In view thereof, the change in the rear wheel requested distribution ratio Dr is subjected to smoothing operation to set the rear wheel executed distribution ratio Dr* (the front wheel executed distribution ratio Df*). In the formulas (1) and (2), "k" is a time constant, and determined within a range from the value of zero to the value of one. Thus, the front wheel executed distribution ratio Df* may be also calculated by subtracting the rear wheel executed distribution ratio Dr* from the value of one.

$$Dr^* = k \cdot \text{former } Dr^* + (1-k) \cdot Dr \quad (1)$$

$$Df^* = k \cdot \text{former } Df^* + (1-k) \cdot (1-Dr) \quad (2)$$

The rear wheel executed distribution ratio Dr* and the front wheel executed distribution ratio Df* are thus set, and then the set rear wheel executed distribution ratio Dr* and the set front wheel executed distribution ratio Df* each are multiplied by the requested braking torque T* to set a rear wheel torque Tr* and a front wheel torque Tf* (Step S140), set a target rotation speed Ne* of the engine 22 to a rotation speed according to the vehicle speed V and set a target torque Te* of the engine 22 to the value of zero (Step S150), and set a torque command Tm1* of the motor MG1 to the value of zero (Step S160). The target rotation speed Ne* of the engine 22 is set to the rotation speed according to the vehicle speed V for quickly outputting required power from the engine 22 when an accelerator pedal 83 is depressed. As the rotation speed according to the vehicle speed V, a higher rotation speed can be used with a higher vehicle speed V.

Next, the vehicle speed v is compared with a threshold value Vref for finishing regenerative control of the motor MG2 or the motor MG3 (Step S170). A threshold value Vref of 5 km/h or 10 km/h, or the like may be used.

Figure 6:
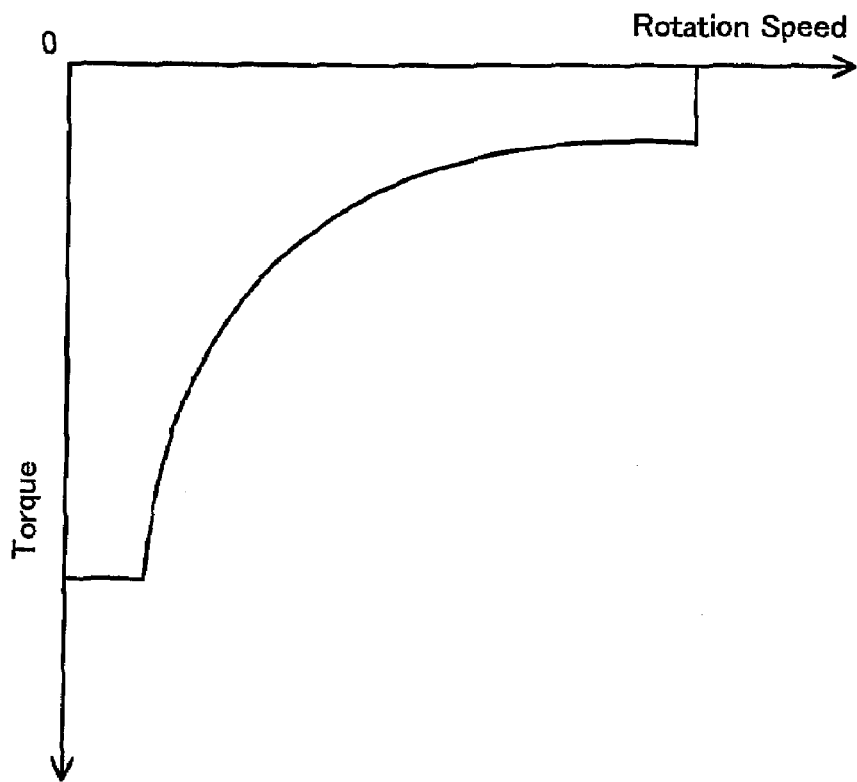
FIG. 6 illustrates an example of a rated regenerative torque of a motor.

When the vehicle speed V is the threshold value Vref or higher, a rated regenerative torque Tm21im of the motor MG2 is derived as a maximum value (a minimum value when the sign in regeneration is negative) of a regenerative torque that can be output from the motor MG2 at the rotation speed Nm2 based on the rotation speed Nm2 of the motor MG2, and a rated regenerative torque Tm31im of the motor MG3 is derived at the rotation speed Nm3 based on the rotation speed Nm3 of the motor MG3 (Step S180). In the embodiment, the rated regenerative torques Tm21im and Tm31im are derived by previously storing a relationship between the rotation speeds Nm2 and Nm3 of the motors MG2 and MG3 and the rated regenerative torques Tm21im and Tm31im of the motors MG2 and MG3 in the ROM 74 as a rated regenerative torque setting map, and deriving corresponding rated regenerative torques Tm21im and Tm31im from the map in receipt of the rotation speeds Nm2 and Nm3 of the motors MG2 and MG3. An example of the rated regenerative torque of the motor is shown in FIG. 6.

Figure 7:
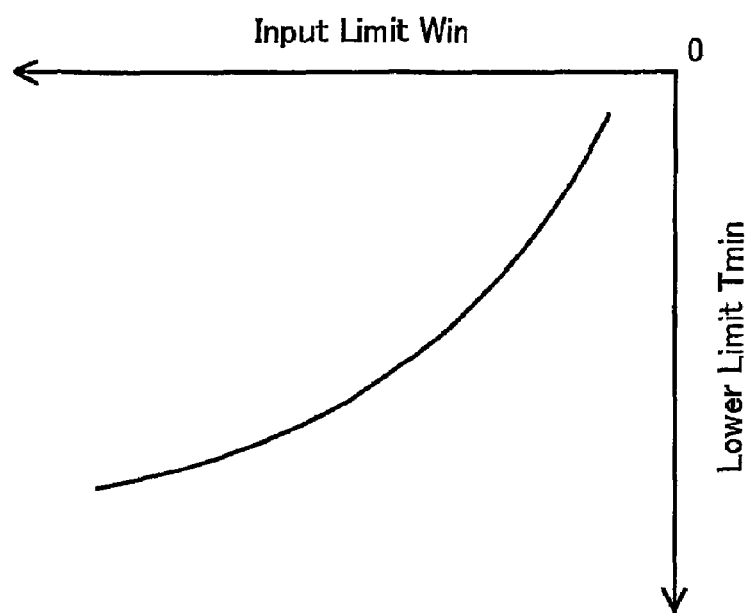
FIG. 7 illustrates an example of a relationship between the input limit Win and a lower limit Tmin (Tm2min and Tm3min)
Figure 8:
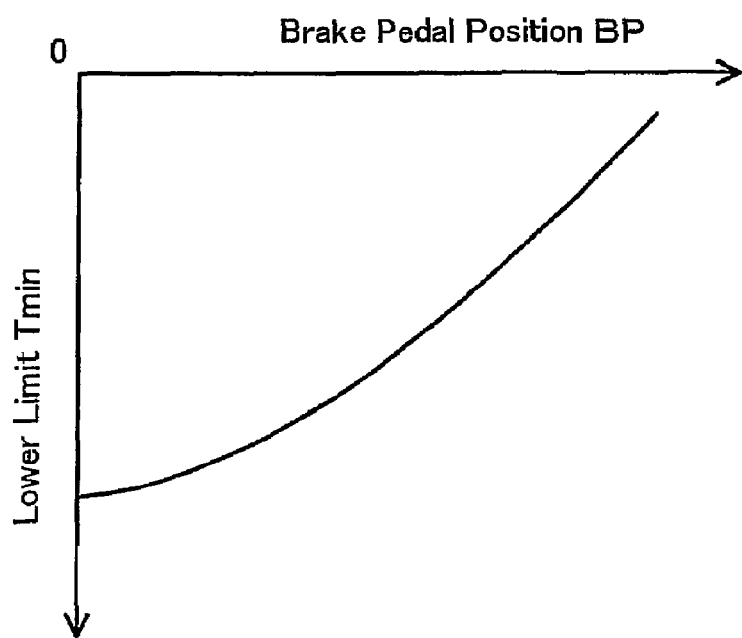
FIG. 8 illustrates an example of a relationship between a brake pedal position BP and the lower limit Tmin (Tm2min and Tm3min)

Then, lower limits Tm2 min and Tm3 min are set as lower limit values of torques that may be output from the motors MG2 and MG3 based on the input limit Win of the battery 50 and the brake pedal position BP (Step S190), and torque limits (input limit torques) Tm2Win and Tm3Win of the motors MG2 and MG3 by input limit Win are set based on the input limit Win of the battery 50 (Steps S200 and S210). In the embodiment, the lower limits Tm2min and Tm3min are set by previously determining a relationship between the input limit Win, the brake pedal position BP and the lower limits Tm2min and Tm3min and storing the relationship in the ROM 74 as a lower limit setting map, and deriving corresponding lower limits Tm2min and Tm3min from the map in receipt of the input limit Win and the brake pedal position BP. An example of the relationship between the input limit Win and the lower limit Tmin (Tm2min and Tm3min) is shown in FIG. 7, and an example of the relationship between the brake pedal position BP and the lower limit Tmin (Tm2min and Tm3min) is shown in FIG. 8. In the embodiment, as shown in FIG. 7, the lower limit Tmin is set so that an absolute value of the lower limit Tmin becomes larger (the value becomes smaller) as an absolute value of the input limit Win becomes larger (the value becomes smaller), and as shown in FIG. 8, the lower limit Tmin is set so that the absolute value of the lower limit Tmin becomes larger (the value becomes smaller) as the brake pedal position BP becomes larger (the value becomes smaller). The input limit torques Tm2Win and Tm3Win can be set by distributing the input limit Win of the battery 50 according to a distribution ratio km for efficiently regenerating electric power by the motors MG2 and MG3 according to rate values on the regeneration side of the motors MG2 and MG3 to calculate motor input limits Win2 and Win3 (Step S200), and dividing the calculated motor input limits Win2 and Win3 by the rotation speeds Nm2 and Nm3 of the motors MG2 and MG3 (Step S210).

Next, the largest value (the smallest value as an absolute value) among a value of the front wheel torque Tf* divided by a gear ratio G2 as a ratio of the rotation speed of the motor MG2 to the front wheels 62a and 62b, a rated regenerative torque Tm21im, a lower limit Tm2min, and an input limit torque Tm2Win is set as a torque command Tm2* of the motor MG2, the largest value (the smallest value as an absolute value) among a value of the rear wheel torque Tr* divided by a gear ratio G3 as a ratio of the rotation speed of the motor MG3 to the rear wheels 64a and 64b, a rated regenerative torque Tm31im, a lower limit Tm3 min, and an input limit torque Tm3Win is set as a torque command Tm3* of the motor MG3 (Step S220), a brake torque command Tbf* is set as a torque to be applied to the front wheels 62a and 62b by the hydraulic brake as a value obtained by subtracting the torque command Tm2* of the motor MG2 multiplied by the gear ratio G2 from the front wheel torque Tf*, and a brake torque command Tbr* is set as a torque to be applied to the rear wheels 64a and 64b by the hydraulic brake as a value obtained by subtracting the torque command Tm3* of the motor MG3 multiplied by the gear ratio G3 from the rear wheel torque Tr* (Step S230). Then, the target rotation speed Ne* and the target torque Te* are transmitted to the engine ECU 24, the torque commands Tm1*, Tm2* and Tm3* are transmitted to the motor ECU 40, and the brake torque commands Tbf* and Tbr* are transmitted to the brake ECU 69 (Step S280), and the routine is finished. The engine ECU 24 having received the target rotation speed Ne* and the target torque Te* of the value of zero performs control such as intake air amount control, fuel injection control or ignition control in the engine 22 so that the engine 22 independently operates at the target rotation speed Ne*. The motor ECU 40 having received the torque commands Tm1*, Tm2* and Tm3* performs switching control of switching elements of inverters 41, 42 and 43 so that the torque (the value of zero) of the torque command Tm1* is output from the motor MG1, the torque of the torque command Tm2* is output from the motor MG2, and the torque of the torque command Tm33* is output from the motor MG3. The brake ECU 69 having received the brake torque commands Tbf* and Tbr* controls the brake actuator 68 so that a braking force corresponding to the brake torque command Tbf* is applied to the front wheels 62a and 62b, and a braking force corresponding to the brake torque command Tbr* is applied to the front wheels 64a and 64b. Thus, a braking force corresponding to the requested braking torque T* can be applied to the front wheels 62a and 62b and the rear wheels 64a and 64b by the braking force by the regenerative control of the motor MG2 and the motor MG3 and the braking force by the hydraulic-brake.

When it is determined in Step S170 that the vehicle speed V is lower than the threshold value Vref, it is determined whether braking torque substitution processing is finished for entirely substituting the braking force by the hydraulic brake for the braking force by the regenerative control of the motor MG2 and the motor MG3 (Step S240). When the braking torque substitution processing is not finished, the braking torque substitution processing is performed (Step S250), the set values including the torque commands Tm2* and Tm3* and the brake torque commands Tbf* and Tbr* set by the braking torque substitution processing are transmitted to the engine ECU 24, the motor ECU 40 and the brake ECU 69 (Step S280), and the routine is finished. In the embodiment, the braking torque substitution processing is performed by gradually increasing the torque command Tm2* of the motor MG2 and the torque command Tm3* of the motor MG3 toward the value of zero, and decreasing the brake torque commands Tbf* and Tbr* (increasing the commands as absolute values) by the same amount The braking torque substitution processing is not the core of the present invention, and more detailed description will be omitted. With such control, the braking force by the regenerative control of the motor MG2 and the motor MG3 and the braking force by the hydraulic brake allow the braking force corresponding to the requested braking torque T* to be applied to the front wheels 62a and 62b and the rear wheels 64a and 64b even during the entire substitution of the braking force by the hydraulic brake for the braking force by the regenerative control of the motor MG2 and the motor MG3.

When it is determined in Step S240 that the braking torque substitution processing is finished, the torque command Tm2* of the motor MG2 and the torque command Tm3* of the motor MG3 are set to the value of zero (Step S260), the front wheel torque Tf* is set to the brake torque command Tbf* of the front wheels 62a and 62b, the rear wheel torque Tr* is set to the brake torque command Tbr* of the rear wheels 64a and 64b (Step S270), the set values are transmitted to the engine ECU 24, the motor ECU 40 and the brake ECU 69 (Step S280), and the routine is finished. Thus, the braking force by the hydraulic brake allows the braking force corresponding to the requested braking torque T* to be applied to the front wheels 62a and 62b and the rear wheels 64a and 64b, and the occurrence of torque shock at the stop can be prevented.

Figure 9:
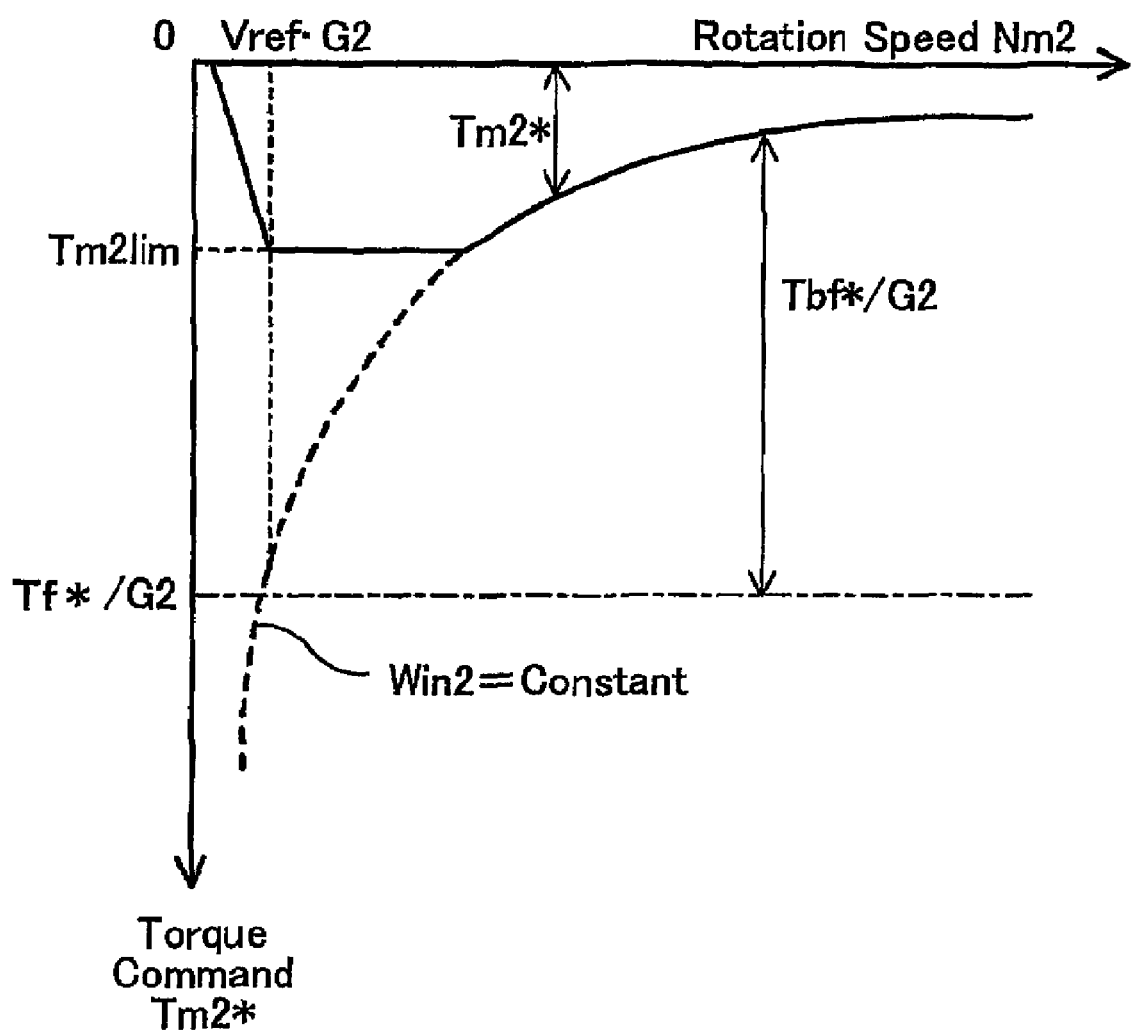
FIG. 9 illustrates an example of a relationship between a rotation speed Nm2 of a motor MG2, a torque command Tm2* and a brake torque command Tbf* when an absolute value of the input limit Win of the battery 50 is small and a brake pedal 85 is relatively deeply depressed.

Now, the case is supposed where the absolute value of the input limit Win of the battery 50 is small (the value is large), and the brake pedal 85 is relatively deeply depressed. An example of a relationship between the rotation speed Nm2 and the torque command Tm2* of the motor MG2 and the brake torque command Tbf* at this time is shown in FIG. 9. In the figure, the solid line shows the torque command Tm2*, and a difference between the value of the front wheel torque Tf* divided by the gear ratio G2 and the torque command Tm2* shows the brake torque command Tbf* of the front wheels 62a and 62b. When the absolute value of the input limit Win of the battery 50 is small, the lower limits Tm2min and Tm3min of the motors MG2 and MG3 are set to be relatively large (small as absolute values). When the vehicle speed V is high, and the rotation speeds Nm2 and Nm3 of the motors MG2 and MG3 are high, the input limit torques Tm2Win and Tm3Win (in the figure, Win2=corresponding points on a constant curve) are set to be larger (smaller as absolute values) than the lower limits Tm2min and Tm3min, thus the input limit torques Tm2Win and Tm3Win are set to the torque commands Tm2* and Tm3*, and the motors MG2 and MG3 are driven and controlled. The rotation speeds Nm2 and Nm3 of the motors MG2 and MG3 are reduced with the reduction in the vehicle speed V, and according thereto, the input limit torques Tm2Win and Tm3Win are also set to be small (large as absolute value). Thus, the larger (smaller as the absolute values) of the input limit torques Tm2Win and Tm3Win and the lower limits Tm2min and Tm3min are set to the torque command Tm2* and Tm3*, and the motors MG2 and MG3 are driven and controlled. When the vehicle speed V is reduced to reach the threshold value Vref (in the figure, a rotation speed of Vref·G2), the braking torque substitution processing is performed to substitute the braking force by the hydraulic brake for the braking force by the motors MG2 and MG3. On the other hand, a comparative example without torque limit by the lower limits Tm2min and Tm3min is supposed. The input limit torques Tm2Win and Tm3Win with the motor input limits Win2 and Win3 being at the points on the constant curve are set to the torque commands Tm2* and Tm3* when the vehicle speed V is reduced to reach the threshold value Vref, and the motors MG2 and MG3 are driven and controlled. When the vehicle speed V nearly reaches the threshold value Vref, the input limit torques Tm2Win and Tm3Win suddenly become small (large as absolute values) with changes in the vehicle speed V, and the torque commands Tm2* and Tm3* also suddenly become small, while the brake torque commands Tbf* and Tbr* suddenly become large (small as absolute values). The motors MG2 and MG3 are controlled by the switching control of the switching elements of the inverters 42 and 43, and thus the torque commands Tm2* and Tm3* can sufficiently follow sudden changes, while the hydraulic brake is controlled by an operation of a control valve by changing a duty ratio of a current to an unshown solenoid of the brake actuator 68, an inflow and outflow of hydraulic oil by the operation of the valve, and thus sudden changes in the brake torque commands Tbf* and Tbr* sometimes cannot be followed. In this case, an excessive braking force is applied to the vehicle to cause torque shock. In the comparative example, when the vehicle speed V reaches the threshold value Vref and the braking torque substitution processing is performed, the braking force (the torque commands Tm2* and Tm3*) by the motors MG2 and MG3 to be substituted is large, which requires an increase in the changes in the brake torque commands Tbf* and Tbr*, thereby causing a braking force beyond the braking force according to the requested braking torque T* to be temporarily applied to the vehicle. This provides to a driver uncomfortable feeling caused by an unexpected braking force being applied to the vehicle. In the embodiment, in order to eliminate such inconvenience, the lower limits Tm2min and Tm3min are set based on the input limit Win of the battery 50 and the brake pedal position BP, and the lower limits Tm2min and Tm3min limit the regenerative torques output from the motors MG2 and MG3. Specifically, the lower limits Tm2min and Tm3min are set so that the changes in the input limit torques Tm2Win and Tm3Win with the change in the vehicle speed V can be sufficiently followed by the control of the hydraulic brake, and the lower limits Tm2min and Tm3min limit the regenerative torques output from the motors MG2 and MG3, thereby preventing an output of an excessive braking force caused by the control of the hydraulic brake being not able to follow the changes, torque shock caused thereby, and an unexpected output of a braking force that may occur in the braking torque substitution processing before the stop.

According to the hybrid automobile 20 of the embodiment as described above, during braking, the lower limits Tm2min and Tm3min are set based on the input limit Win of the battery 50 and the brake pedal position BP, and the set lower limits Tm2min and Tm3min limit the regenerative torques output from the motors MG2 and MG3, thereby preventing inconvenience caused when the vehicle speed V is reduced, for example, an output of an excessive braking force caused by the control of the hydraulic brake being not able to follow the changes, torque shock caused thereby, and an unexpected output of a braking force that may occur in the braking torque substitution processing before the stop. This allows smooth coordination between the application of the braking force by the motors MG2 and MG3 and the application of the braking force by the hydraulic brake. Also, during braking, a larger amount of kinetic energy of the vehicle can be regenerated to electric power, thereby increasing energy efficiency of the vehicle.

In the hybrid automobile 20 of the embodiment, during braking, the lower limits Tm2min and Tm3min are set based on the input limit Win of the battery 50 and the brake pedal position BP, but instead of the brake pedal position BP, a depression force when the driver depresses the brake pedal 85, or pressure of an unshown brake master cylinder (brake pressure), or the like may be used to set the lower limits Tm2min and Tm3min. Also, the deceleration of the vehicle may be used to set the lower limits Tm2min and Tm3min.

In the hybrid automobile 20 of the embodiment, when the vehicle speed V is reduced to reach the threshold value Vref, the braking force by the hydraulic brake is substituted for the braking force by the motors MG2 and MG3 in the braking torque substitution processing, but such substitution may not be performed.

In the hybrid automobile 20 of the embodiment, during braking, the braking force for applying the requested braking torque T* to the front wheels 62a and 62b and the rear wheels 64a and 64b is distributed by the front wheel executed distribution ratio Df* and the rear wheel executed distribution ratio Dr*, the regenerative torque is output from the motor MG2 for the front wheel torque Tf*, and the regenerative torque is output from the motor MG3 for the rear wheel torque Tr*. However, the regenerative torque may be output from the motor MG2 for the front wheel torque Tf*, while the regenerative torque may not be output from the motor MG3 for the rear wheel torque Tr*, or the regenerative torque may not be output from the motor MG2 for the front wheel torque Tf*, while the regenerative torque may be output from the motor MG3 for the rear wheel torque Tr*. In this case, the input limit torque and the lower limit torque may be set relative to the motor that outputs the regenerative torque to perform control.

In the hybrid automobile 20 of the embodiment, the rear wheel executed distribution ratio Dr* (the front wheel executed distribution ratio Df*) is set by the smoothing operation, but the rear wheel executed distribution ratio Dr* (the front wheel executed distribution ratio Df*) may be set by other moderate change process such as rate process.

In the hybrid automobile 20 of the embodiment, the engine 22, the power distribution and integration mechanism 30 and the motors MG1 and MG2 are connected to the front wheels 62a and 62b, and the motor MG3 is connected to the rear wheels 64a and 64b, but the engine 22, the power distribution and integration mechanism 30 and the motors MG1 and MG2 may be connected to the rear wheels 64a and 64b, and the motor MG3 may be connected to the front wheels 62a and 62b.

Figure 10:
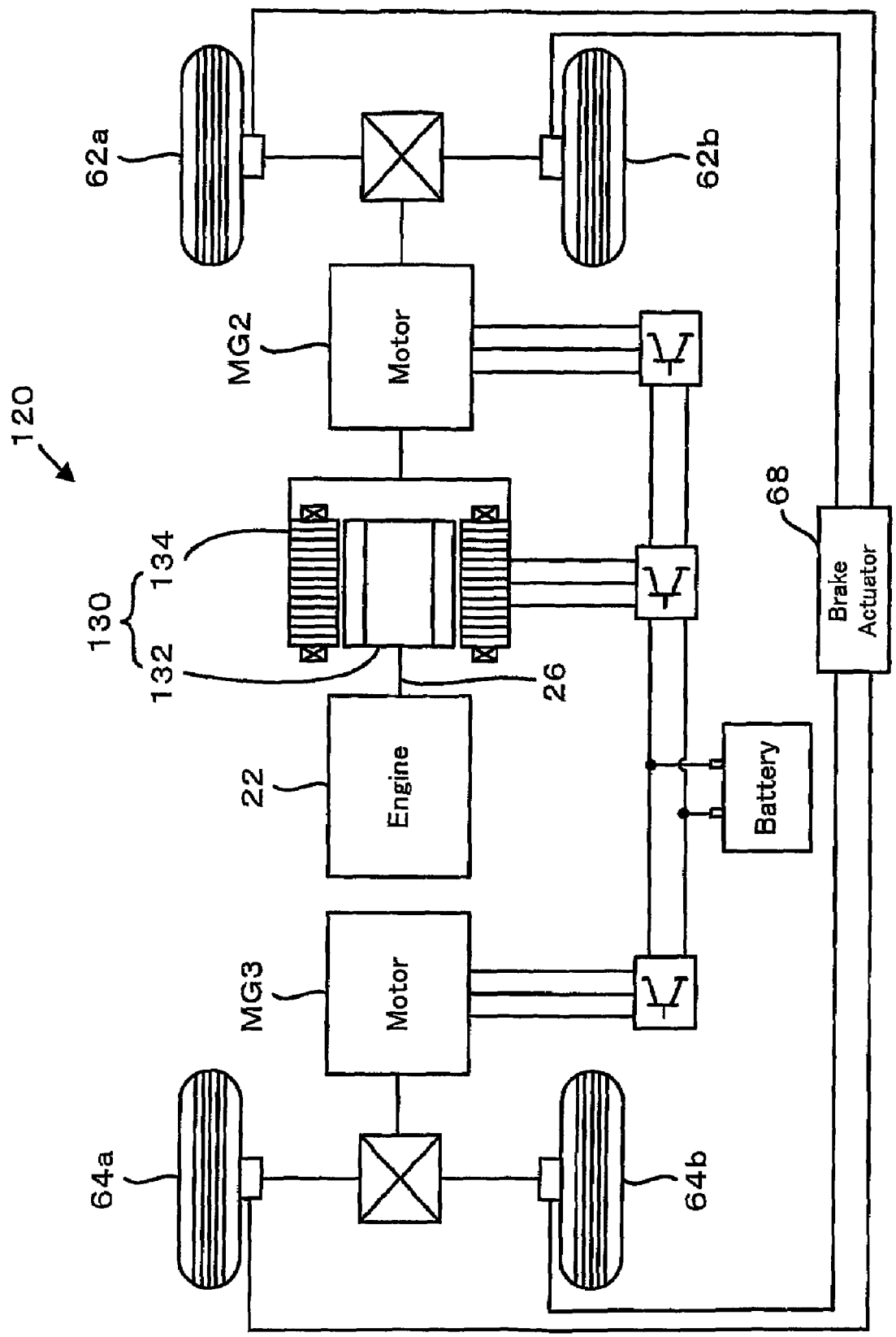
FIG. 10 schematically shows a configuration of a hybrid automobile 120 according to a variant.

In the hybrid automobile 20 of the embodiment, power from the engine 22 is output via the power distribution and integration mechanism 30 to the front wheels 62a and 62b, but as shown in FIG. 10, a hybrid automobile 120 of a variant may include an inner rotor 132 connected to a crankshaft 26 of an engine 22, and an outer rotor 134 connected to a drive shaft coupled to front wheels 62a and 62b, and include a paired rotor motor 130 that outputs part of power of the engine 22 to the front wheels 62a and 62b with input and output of electric power and power by electromagnetic action.

Figure 11:
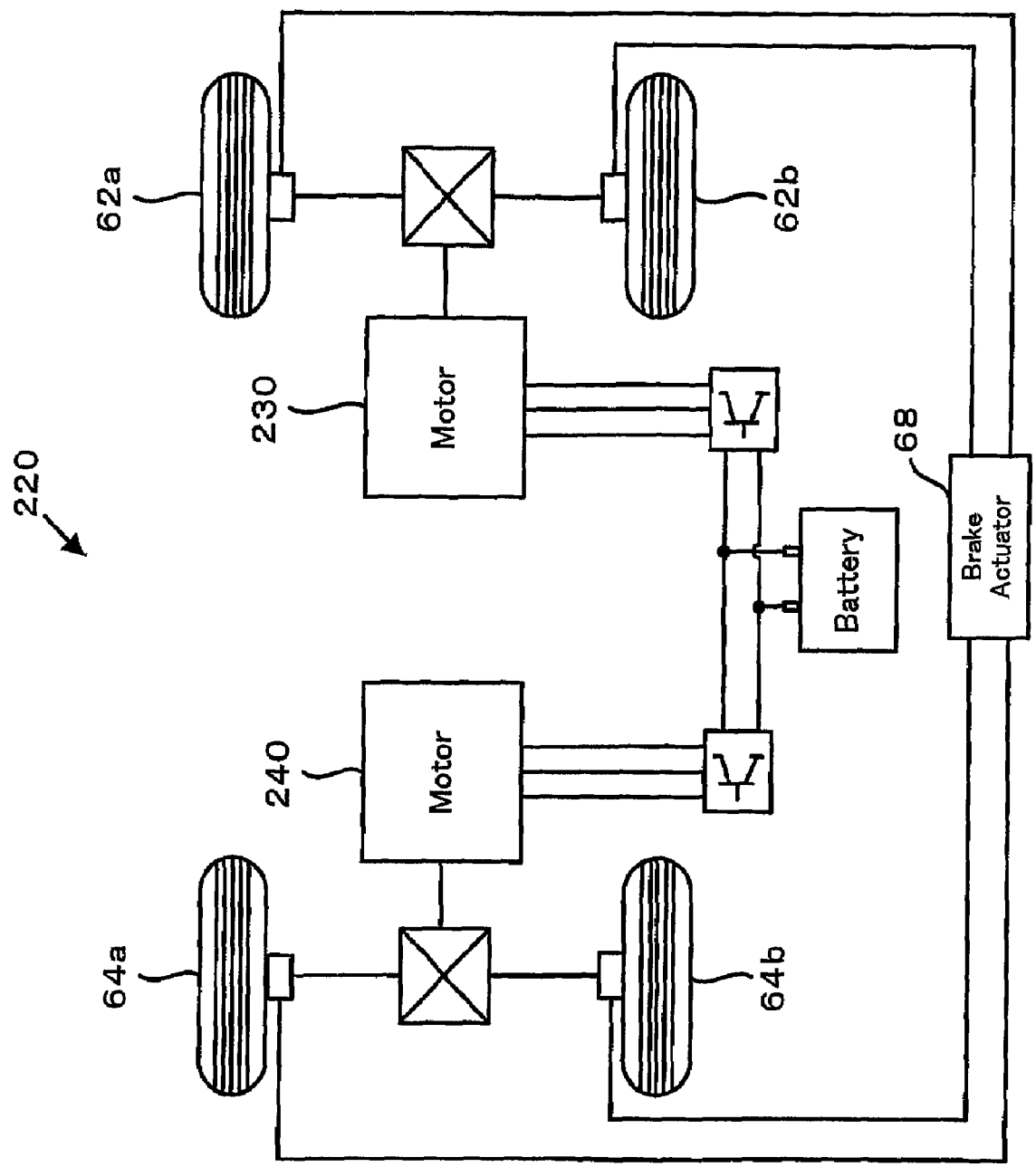
FIG. 11 schematically shows a configuration of an electric automobile 220 according to a variant.

Further, the present invention may be applied to any type of automobiles including a motor that can output power to front wheels and a motor that can output power to rear wheels. For example, the present invention may be applied to a hybrid automobile including an engine that outputs power to front wheels, and a motor that outputs power to rear wheels, or as shown in FIG. 11, the present invention may be applied to an electric automobile 220 including a motor 230 that is connected to front wheels 62a and 62b and can generate electric power, and a motor 240 that is connected to rear wheels 64a and 64b and can generate electric power. Also, the present invention may be applied to an automobile of the type including a motor only that can output power to front wheels, or including a motor only that can output power to rear wheels. In these cases, a motor may be provided in each of the front wheels or the rear wheels.

In the embodiment, the hybrid automobile has been illustrated as an embodiment of the present invention, but the present invention may be applied to vehicles other than automobiles, or mobile units other than vehicles. The present invention may be a braking device that applies a braking force to such a mobile unit, or a control method of a vehicle or a braking device.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The present invention is applicable in production industry of vehicles or braking devices.

The invention claimed is:

1. A vehicle, comprising:
    a braking force application unit that applies a braking force by hydraulic actuation;
    at least one motor that can output a regenerative torque;
    an electric storage unit that can transfer electric power to and from said motor;
    a rotation speed detection unit that detects a rotation speed of said motor;
    an input limit setting unit that sets an input limit as maximum permissible electric power in charging said electric storage unit based on a state of said electric storage unit;
    a braking request detection unit that detects a braking request requested by the vehicle;
    a lower limit regenerative torque setting unit that sets a lower limit regenerative torque as a lower limit value of a regenerative torque output from said motor so that the absolute value thereof becomes smaller as an absolute value of said detected braking request becomes larger and an absolute value thereof becomes smaller as an absolute value of said set input limit becomes smaller; and
    a braking control unit that controls said motor and said braking force application unit so that the regenerative torque is output from said motor within a range of a rated torque of said motor based on said detected rotation speed of the motor, an input limit torque based on said set input limit, said input limit torque is a torque whose absolute value becomes larger as said detected rotation speed of the motor becomes smaller and changes more significantly with the change of the rotation speed of the motor as said detected rotation speed of the motor becomes smaller and said set lower limit regenerative torque, and a braking force according to said detected braking request is applied to the vehicle,
    wherein the braking control unit is configured to control said motor and said braking force application unit so that when the rotation speed detected by said rotation speed detection unit is lower than a predetermined rotation speed, no regenerative torque is output from said motor, and the braking force according to said detected braking request is applied to the vehicle.

2. The vehicle according to claim 1, wherein said lower limit regenerative torque setting unit sets the lower limit regenerative torque so that an absolute value thereof becomes smaller as an absolute value of said set input limit becomes smaller.

3. The vehicle according to claim 1, wherein said lower limit regenerative torque setting unit sets the lower limit regenerative torque so that the absolute value thereof becomes smaller as an absolute value of said detected braking request becomes larger.

4. The vehicle according to claim 1, wherein said braking control unit controls said motor so that the largest regenerative torque within the range of the rated torque of said motor and said set lower limit regenerative torque is output from said motor, and controls said braking force application unit so that a braking force of a difference between a driving force according to said detected braking request and a braking force by the regenerative torque output from said motor is applied from said braking force application unit.

5. The vehicle according to claim 1, wherein said braking control unit controls said motor and said braking force application unit so that when the rotation speed detected by said rotation speed detection unit is said predetermined speed or higher, the regenerative torque is output from said motor within the range of the rated torque of said motor, an input limit torque based on said set input limit, and said set lower limit regenerative torque, and the braking force according to said detected braking request is applied to the vehicle.

6. The vehicle according to claim 1, wherein said motor is a plurality of motors connected to different axles.

7. The vehicle according to claim 6, wherein said lower limit regenerative torque setting unit sets a lower limit regenerative torque for each of said plurality of motors, said braking control unit performs control so that a regenerative torque is output from each of said plurality of motors within a range of a rated torque of each of said plurality of motors, said set input limit, and a lower limit regenerative torque set for each of said plurality of motors.

8. The vehicle according to claim 1, wherein said braking request detection unit detects physical quantities relating to an operation of a brake pedal by an operator.

9. A braking device that applies a braking force to a mobile unit, comprising:
   a braking force application unit that applies a braking force by hydraulic actuation;
   at least one motor that can output a regenerative torque;
   an electric storage unit that can transfer electric power to and from said motor;
   a rotation speed detection unit that detects a rotation speed of said motor;
   an input limit setting unit that sets an input limit as maximum permissible electric power in charging said electric storage unit based on a state of said electric storage unit;
   a braking request detection unit that detects a braking request requested by the mobile unit;
   a lower limit regenerative torque setting unit that sets a lower limit regenerative torque as a lower limit value of a regenerative torque output from said motor so that the absolute value thereof becomes smaller as an absolute value of said detected braking request becomes larger and an absolute value thereof becomes smaller as an absolute value of said set input limit becomes smaller; and
   a braking control unit that controls said motor and said braking force application unit so that the regenerative torque is output from said motor within a range of a rated torque of said motor based on said detected rotation speed of the motor, an input limit torque based on said set input limit, said input limit torque is a torque whose absolute value becomes larger as said detected rotation speed of the motor becomes smaller and changes more significantly with the change of the rotation speed of the motor as said detected rotation speed of the motor becomes smaller and said set lower limit regenerative torque, and a braking force according to said detected braking request is applied to the mobile unit,
   wherein the braking control unit is configured to control said motor and said braking force application unit so that when the rotation speed detected by said rotation speed detection unit is lower than a predetermined rotation speed, no regenerative torque is output from said motor, and the braking force according to said detected braking request is applied to the vehicle.

10. A control method of a vehicle comprising: a braking force application unit that applies a braking force by hydraulic actuation; at least one motor that can output a regenerative torque; and an electric storage unit that can transfer electric power to and from said motor, said control method comprising the steps of:
   setting a lower limit regenerative torque as a lower limit value of the regenerative torque output from said motor based on a braking request requested by the vehicle, and an input limit as maximum permissible electric power in charging said electric storage unit;
   controlling said motor and said braking force application unit so that the regenerative torque is output from said motor within a range of a rated torque of said motor based on a rotation speed of said motor, an input limit torque based on said set input limit, said input limit torque is a torque whose absolute value becomes larger as the rotation speed of the motor becomes smaller and changes more significantly with the change of the rotation speed of the motor as the rotation speed of the motor becomes smaller and said set lower limit regenerative torque, and a braking force according to said braking request is applied to the vehicle; and
   controlling said motor and said braking force application unit so that when the rotation speed of the motor is lower than a predetermined rotation speed, no regenerative torque is output from said motor, and the braking force according to said braking request is applied to the vehicle.

11. The control method of a vehicle according to claim 10, sets the lower limit regenerative torque so that an absolute value thereof becomes smaller as an absolute value of said input limit becomes smaller.

12. The control method of a vehicle according to claim 10, sets the lower limit regenerative torque so that the absolute value thereof becomes smaller as an absolute value of said braking request becomes larger.

13. The control method of a vehicle according to claim 10, controls said motor so that the largest regenerative torque within the range of the rated torque of said motor and said set lower limit regenerative torque is output from said motor, and controls said braking force application unit so that a braking force of a difference between a driving force according to said braking request and a braking force by the regenerative torque output from said motor is applied from said braking force application unit.

14. The control method of a vehicle according to claim 10, wherein said control method controls said motor and said braking force application unit so that when the rotation speed is said predetermined rotation speed or higher, the regenerative torque is output from said motor within the range of the rated torque of said motor, an input limit torque based on said input limit, and said set lower limit regenerative torque, and the braking force according to said braking request is applied to the vehicle.

* * * * *

UNITED STATES PATENT AND TRADEMARK OFFICE
CERTIFICATE OF CORRECTION

PATENT NO. : 8,040,084 B2
APPLICATION NO. : 12/162554
DATED : October 18, 2011
INVENTOR(S) : Koichiro Muta Page 1 of 1

It is certified that error appears in the above-identified patent and that said Letters Patent is hereby corrected as shown below:

| Column | Line | |
|---|---|---|
| 10 | 61 | Change "vehicle speed v" to --vehicle speed V--. |
| 10 | 66 | Change "torque Tm21*im*" to --torque TM2*lim*--. |
| 11 | 4 | Change "Tm31*im*" to --TM3*lim*--. |
| 11 | 7 | Change "Tm21*im* and Tm31*im*" to --TM2*lim* and TM3*lim*--. |
| 11 | 10 | Change "Tm31*im*" to --TM3*lim*--. |
| 11 | 13 | Change "Tm21*im* and Tm31*im*" to --TM2*lim* and TM3*lim*--. |
| 11 | 56 | Change "Tm21*im*" to --TM2*lim*--. |
| 11 | 62 | Change "Tm31*im*" to --TM3*lim*--. |

Signed and Sealed this
Twelfth Day of June, 2012

David J. Kappos
*Director of the United States Patent and Trademark Office*